US010227172B2

(12) United States Patent
Lewis et al.

(10) Patent No.: US 10,227,172 B2
(45) Date of Patent: Mar. 12, 2019

(54) MICROWAVE POPCORN BAG

(75) Inventors: Justin Coulter Lewis, Arlington, MA (US); Kristine Homes Lewis, Arlington, MA (US)

(73) Assignee: Quinn Foods, LLC, Boulder, CO (US)

( * ) Notice: Subject to any disclaimer, the term of this patent is extended or adjusted under 35 U.S.C. 154(b) by 419 days.

(21) Appl. No.: 13/568,775

(22) Filed: Aug. 7, 2012

(65) Prior Publication Data
US 2014/0044840 A1 Feb. 13, 2014

(51) Int. Cl.
*B65D 81/34* (2006.01)
*A23L 1/18* (2006.01)
*A23L 5/10* (2016.01)
*A23L 7/183* (2016.01)
*A23L 7/187* (2016.01)
*A23L 7/191* (2016.01)
*B65D 75/52* (2006.01)

(52) U.S. Cl.
CPC ............ *B65D 81/3469* (2013.01); *A23L 5/15* (2016.08); *A23L 7/183* (2016.08); *A23L 7/187* (2016.08); *A23L 7/191* (2016.08); *B65D 75/522* (2013.01); *B65D 2581/3421* (2013.01); *Y02W 90/13* (2015.05); *Y02W 90/14* (2015.05)

(58) Field of Classification Search
CPC ............ B65D 81/3461; B65D 81/3469; B65D 81/34; B65D 33/01; B65D 65/40; B65D 73/00; B65D 75/00; A23L 1/18
USPC .......................................... 219/727; 426/107
See application file for complete search history.

(56) References Cited

U.S. PATENT DOCUMENTS

| 3,360,183 A * | 12/1967 | Stahl ............................... 383/35 |
| 3,973,045 A * | 8/1976 | Brandberg ......... B65D 81/3469 383/120 |
| 4,767,635 A * | 8/1988 | Merritt et al. ................ 426/272 |
| 4,810,844 A | 3/1989 | Anderson |
| 4,904,488 A * | 2/1990 | LaBaw et al. ................ 426/107 |
| 5,344,661 A * | 9/1994 | Mendenhall et al. ........ 426/107 |
| 5,357,086 A | 10/1994 | Turpin et al. |
| 5,496,252 A * | 3/1996 | Gilbert .......................... 493/224 |
| 5,650,084 A * | 7/1997 | Bley ............................. 219/727 |
| 5,919,505 A * | 7/1999 | Monsalve et al. ............. 426/107 |
| 6,100,513 A * | 8/2000 | Jackson et al. ................ 219/727 |
| 6,572,904 B2 * | 6/2003 | Rhee .................... B65D 75/527 206/459.5 |
| 7,780,353 B2 * | 8/2010 | Yoffe ..................... B31B 19/36 383/101 |
| 8,091,503 B2 | 1/2012 | LeFevre et al. |
| 8,544,718 B2 * | 10/2013 | Yamato et al. ............. 229/5.84 |
| 8,735,786 B2 * | 5/2014 | Gorman et al. ............. 219/730 |
| 2002/0100755 A1 | 8/2002 | Peterson |

(Continued)

OTHER PUBLICATIONS

Plastics in the Microwave Oven, CE 245. Daniel Flucher, Christopher Hunter, and Martine Schaefer; Apr. 2001.*
Jeter, Brandi. "Orville Redenbacher's Pop Up Bowl." Feb. 12, 2011. <http://mamaknowsitall.com/2011/02/orville-redenbachers-pop-up-bowl.html> Accessed Jun. 5, 2015.*
Fox. "How to Microwave Gourmet Popcorn in a Brown Paper Bag." Aug. 14, 2010. <http://www.squawkfox.com/2010/07/27/popcorn-recipe-gourmet-popcorn> Accessed Jun. 12, 2015.*

(Continued)

*Primary Examiner* — Michele L Jacobson
*Assistant Examiner* — Ericson M Lachica

(57) ABSTRACT

A microwaveable popcorn container may be fashioned from glassine or similar materials to provide a susceptor-free, biodegradable, and/or compostable container for cooking microwave popcorn. The material of the container may be translucent in order to advantageously permit inspection of contents during cooking, as well as to permit evaluation of the completeness of kernel popping after microwaving.

22 Claims, 3 Drawing Sheets

(56) References Cited

U.S. PATENT DOCUMENTS

| | | | |
|---|---|---|---|
| 2005/0192377 A1* | 9/2005 | Scheer et al. | 523/124 |
| 2006/0073190 A1* | 4/2006 | Carroll et al. | 424/440 |
| 2006/0172045 A1* | 8/2006 | Zeng | 426/115 |
| 2007/0212969 A1* | 9/2007 | Trochlil et al. | 442/385 |
| 2007/0237863 A1* | 10/2007 | Langen | 426/107 |
| 2007/0254073 A1* | 11/2007 | Jensen et al. | 426/107 |
| 2008/0075815 A1* | 3/2008 | Reynolds | B65D 25/48 426/107 |
| 2008/0178744 A1 | 7/2008 | Hill | |
| 2008/0268106 A1* | 10/2008 | Jackson et al. | 426/107 |
| 2009/0029013 A1 | 1/2009 | Berthault | |
| 2010/0068353 A1* | 3/2010 | Gorman et al. | 426/107 |
| 2010/0150972 A1* | 6/2010 | West et al. | 424/401 |
| 2010/0183773 A1 | 7/2010 | Malone et al. | |
| 2011/0120992 A1* | 5/2011 | Gorman et al. | 219/727 |
| 2012/0204483 A1* | 8/2012 | Van den Heuvel et al. | 44/605 |

OTHER PUBLICATIONS

"PFCs." Toxic Effects Everyday Exposures. Metametrix, Inc. Mar. 8, 2011. <http://www.everydayexposures.com/toxins/pfcs> Accessed Jun. 12, 2015.*

"Pallets of Popcorn", http://www.quinnpopcorn.com/2011/08/pallets-of-popcorn/NPL-1 Aug. 1, 2012 , 1 page.

"Popcorn Yield", http://www.quinnpopcorn.com/2011/03/popcorn-yield/ NPL-5 Mar. 2011 , 1 Page.

"Popcorn Bag Dissection", http://quinnpopcorn.com/2010/12/popcorn-bag-dissection/ NPL-3 Dec. 2010 , pp. 1-3.

"The Popcorn Bag", http://www.quinnpopcorn.com/2010/12/the-popcorn-bag/ NPL-2 Dec. 2010 , 1 page.

"Bag Material Options", http://www.quinnpopcorn.com/2011/01/bag-material-options/ NPL-4 Jan. 2011 , pp. 1-2.

"Microwave Bag Experiments", http://www.quinnpopcorn.com/2011/01/microwave-bag-experiments/ NPL-6 Jan. 2011 , pp. 1-2.

* cited by examiner

MICROWAVE POPCORN BAG

BACKGROUND

There remains a need for an improved microwave popcorn bag.

SUMMARY

A microwaveable popcorn container may be fashioned from glassine or similar materials to provide a susceptor-free, biodegradable, and/or compostable container for cooking microwave popcorn. The material of the container may be translucent in order to advantageously permit inspection of contents during cooking, as well as to permit evaluation of the completeness of kernel popping after microwaving.

BRIEF DESCRIPTION OF THE FIGURES

The invention and the following detailed description of certain embodiments thereof may be understood by reference to the following figures. The drawings are not necessarily to scale, emphasis instead being placed upon illustrating the principles of the invention.

DETAILED DESCRIPTION

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus the term "or" should generally be understood to mean "and/or" and so forth.

Figure 1:
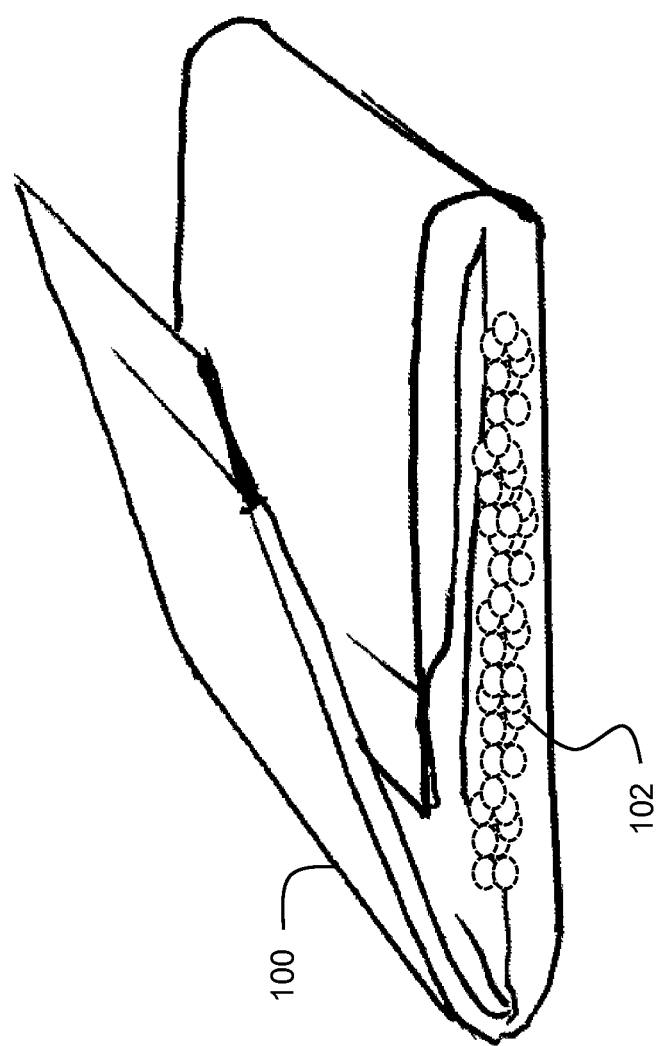
FIG. 1 depicts a microwavable container in a collapsed state.

FIG. 1 depicts a container 100 in a collapsed shape containing a food item 102 such as popcorn. The container 100 may be formed of any suitable microwavable material, thus providing a microwavable food package.

In general, the food item 102 may expand as microwave energy is applied. The container 100, which may have a variety of shapes and sizes, may be folded or otherwise collapsed in a manner that permits expansion of the container 100 as the food item 102 (e.g., popcorn) expands within an interior of the container 100 during cooking It will be understood that, while the expanding food item 102 may exert pressure on the sidewalls of the container 100 to expand the container 100 into its expanded state, the container 100 may also or instead expand under pressure of steam released from the cooking food item 102. A heat or steam sensitive adhesive may be used for a portion of the container 100 in order for the container 100 to partially open and vent remaining steam at some point during the cooking process. The manner in which the container 100 expands during cooking is unimportant, provided the container 100 expands with sufficient speed and ease to accommodate the expanding food item 102 therein. The container 100 may, for example, be a convention gusset bag that unfolds into a containing volume, as commonly used in the art. Other folding techniques are also known, and may be adapted to form an expandable bag suitable for use as the container 100.

The container 100 may be formed of environmentally friendly materials. For example, the container 100 may be compostable and/or biodegradable.

The container 100 may also or instead be advantageously formed of materials free from potentially harmful chemicals or the like. For example the container 100 may be free of plastic. The container 100 may be free of perfluorochemicals.

The container 100 may be free of a susceptor found in commercially available microwave popcorn containers. A susceptor is a device that absorbs microwave energy and converts it to heat. In commercially available microwave popcorn bags, a susceptor is used to concentrate heat in an area where popping is desired. The susceptor is generally laminated into or printed onto the plies of sheet material that form the bag. While this may improve cooking time, the susceptor is typically formed of materials such as a polyethylene terephthalate (PET) film lightly metalized with an elemental aluminum and a ceramic, graphite, magnetite, and/or various oxides, all of which is adhered to a dimensionally stable substrate such as paperboard. In use, the susceptor can reach temperatures of up to 500 degrees Fahrenheit and the PET can escape into adjacent food and packaging. Thus, a susceptor-free container advantageously removes a source of synthetic compounds that might otherwise migrate into food during cooking.

The container 100 may be similarly fabricated free of other materials that might release harmful chemicals during storage and use. One material meeting all of the above constraints is glassine, which is a smooth, thin formed paper formed with aligned fibers through a web rolling process referred to as supercalendering. Glassine is generally air and water-resistant. Glassine is also generally translucent unless dyes or the like are added. Glassine is available in a variety of weights ranging from 45-120 grams per meter squared (gsm). The glassine in the container may usefully have a weight of about 65 gsm, or in a range from about 60-90 gsm.

The translucence of the glassine also advantageously permits viewing of the contents of the container 100, including viewing before cooking, during cooking, and after cooking One measure of translucence commonly used for glassine is opacity, which is generally expressed as a percentage indicating how much light from a source passes through a material. The higher the percentage the more opaque the material and the lower the percentage the more translucent the material. The level of opacity for glassine can be controlled using a variety of techniques including varying the thickness of the material or adding dyes, chemicals, fillers, coatings, and so forth. The glassine used in the container 100 preferably has an opacity of about 80-90%, and may usefully have an opacity of about 50-95%.

While glassine has a number of properties well suited to packaging dry foods such as unpopped popcorn kernels, it will be appreciated that any other material with similar properties may also or instead be used for the container 100.

Figure 2:
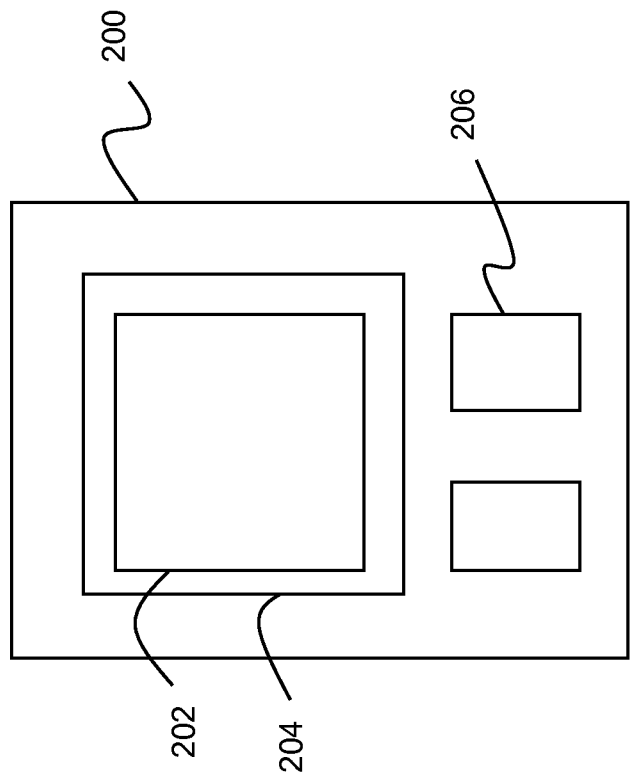
FIG. 2 shows packaging for a microwaveable container.

FIG. 2 shows packaging for a microwaveable container. A food package 200 may be a cardboard box or the like, and may include a container 202 such as the container described above. The container 202 may be wrapped in an airtight container 204 such as a plastic wrapper (e.g., a high barrier, clear plastic) that hermetically seals the container 202 against flow of gases for shipping and handling. The contents of the container 202 may be free of flavor additives and/or cooking additives, in which case, one or more additives 206 may be packaged for shipment with the container 202 in separate, non-microwavable containers. This may for example include wet additives such as oil, as well as dry additives such as salt, spices, flavorings, and so forth. This arrangement provides numerous advantages. For example, providing additives in this manner permits a customer to control the amount of flavoring added to the popcorn before eating. This arrangement also permits greater flexibility for the manufacturer to use natural ingredients with more varied flavors. By contrast, conventional techniques include flavoring and oil in the microwavable container, where the additives are formed into a carefully engineered precursor capable of achieving a desired flavor profile after withstanding several minutes at the high temperatures of microwave cooking.

In order to facilitate mixing of additives with cooked popcorn, the expanded state may have substantially more interior volume than an expected total volume of the cooked popcorn. That is, after optimal microwaving (not undercooked, and not burnt), the popcorn may only fill 80%, or some lesser or greater amount that similarly provides extra volume within the expanded container. With this extra volume, the container 200 can be opened, the additives 206 can be added, and the container 200 can be shaken to toss the additives 206 in and with the popcorn for an even distribution of flavor additives throughout the popcorn. Thus in one aspect there is disclosed herein a microwaveable container for popcorn wherein the popcorn pops to a maximum volume of not more than 80% of a volume of the container in an expanded shape, thereby providing a space in which to shake one or more flavor additives into the popcorn after popping. It will be understood that the container 200 may be relatively larger or smaller compared to the volume of the popped popcorn. The popcorn may thus more generally pop to a maximum volume of about 70% to about 90% of the volume of the container, or some other amount depending upon the size and shape of the container, the amount of popcorn, and the nature of the additives 206.

Figure 3:
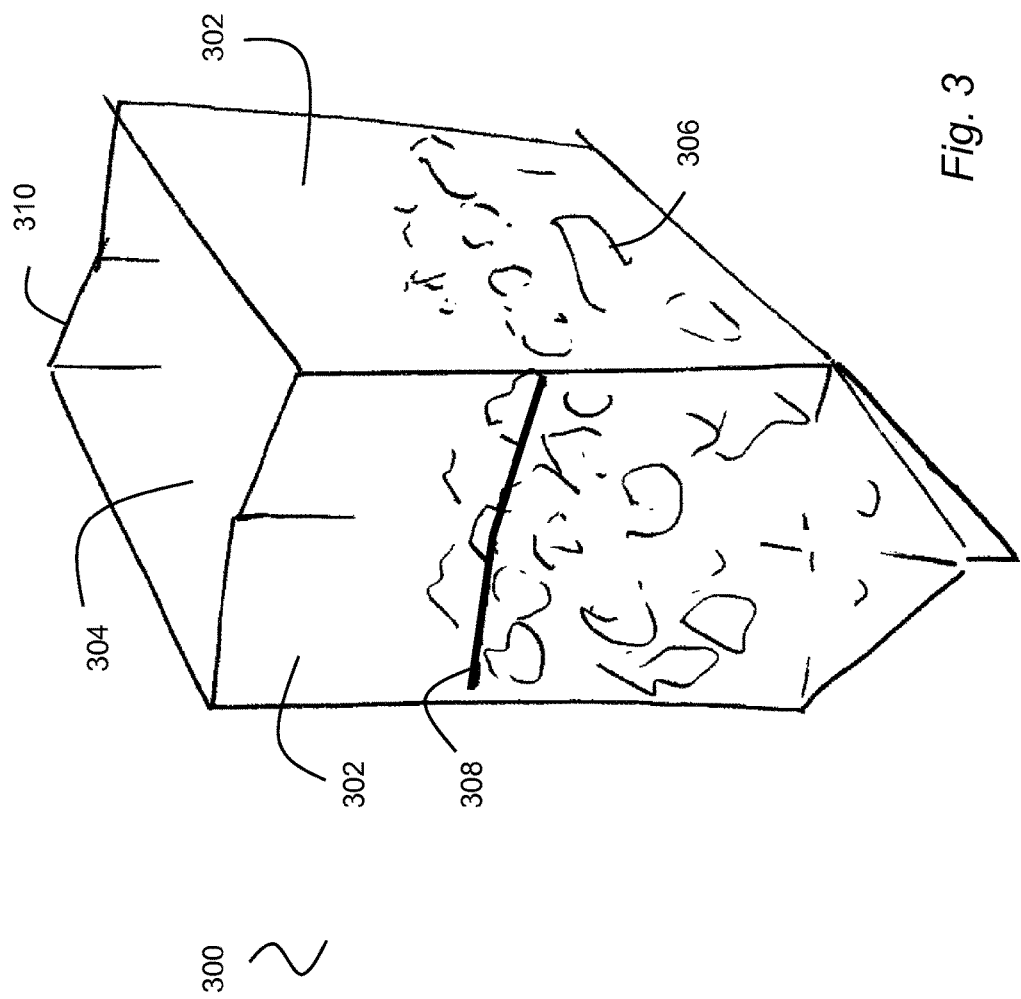
FIG. 3 depicts a microwaveable container in an expanded state.

FIG. 3 depicts a microwaveable container in an expanded state, e.g., filled with popped kernels of corn after microwaving. The container 300 may include two or more sidewalls 302 forming an interior 304 enclosing the popcorn 306. As noted above, the container 300 may have a collapsed state where container is folded into a collapsed shape about the interior 304 in a manner that permits expansion of the container into an expanded shape as the popcorn expands within the interior.

The container 300 may include an opaque line 308 such as a solid line, a dashed line, or some other opaque marking that indicates a degree of completion of cooking according to a volume of the popcorn 306 within the container 300 in its expanded shape. The opaque line 308 may be positioned on one of the sidewalls 302 at a location that indicates, for example, a maximum predicted expansion of the popcorn 306 without overheating or overcooking, or a predicted volume after a certain percentage of completion (e.g., about 90% of kernels popped).

The opaque line 308 may be oriented horizontally when an open top 310 of the container 300 is positioned upright after cooking, as depicted for example in FIG. 3. By viewing popcorn through the translucent sidewalls 302, the opaque line 308 provides an objective reference point for cooking. In one aspect, this may be used to provide visual feedback after cooking has stopped and the container 300 has been removed from the microwave oven. In this context, the opaque line 308 may serve as a teaching tool for consumers, particularly where the absence of a susceptor and various additives might affect cooking time relative to commercially available alternatives. It will be understood that while a single opaque line 308 is depicted, any number of opaque lines may be included on one or more sidewalls 302, such as to provide a range of indicators for different levels of completion.

In another aspect, the opaque line 308 may be positioned and oriented to provide visual feedback during cooking. Thus an opaque line 308 may also or instead be oriented so that it is horizontal when the container 300 is placed for use in a microwave oven as depicted, e.g., in FIG. 1. In this orientation, a microwave operator can visually inspect progress toward completion during cooking, such as by viewing the container 300 through a microwave window.

According to the foregoing, popcorn or similar food products may be provided simply and naturally without any cooking additives, while accommodating the addition of a wide range of flavorings and seasonings after microwaving is complete.

While particular embodiments of the present invention have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A microwaveable food package, comprising:
popcorn that expands while cooking under an application of microwave energy, the popcorn having an expected volume after cooking;
a container for the popcorn having a first end and a second end and including a plurality of sidewalls between the first end of the container and the second end of the container, the first end of the container configured to be opened after cooking, the plurality of sidewalls defining an interior volume within which the popcorn is disposed, a first sidewall of the plurality of sidewalls being formed of a translucent glassine material, the container being folded into a collapsed shape about the interior volume in a manner that permits expansion of the container into an expanded shape as the popcorn expands within the interior volume;
a first opaque line on the first sidewall of the plurality of sidewalls, the first opaque line indicating the expected volume after cooking of 70% to 90% of a maximum volume of the interior volume of the container when the container is in the expanded shape; and
a second opaque line on the first sidewall of the plurality of sidewalls, the second opaque line indicating a maximum volume of the popcorn in the container when the container is in the expanded shape after cooking.

2. The microwaveable food package of claim 1, wherein the container is formed of a biodegradable material.

3. The microwaveable food package of claim 1, wherein the container is formed of a compostable material.

4. The microwaveable food package of claim 1, wherein the popcorn and the container are free of flavor additives.

5. The microwaveable food package of claim 1, wherein the popcorn and the container are free of cooking additives.

6. The microwaveable food package of claim 1, wherein the popcorn and the container are free of perfluorochemicals.

7. The microwaveable food package of claim 1, wherein the container is free of plastic.

8. The microwaveable food package of claim 1, wherein the container is free of susceptors.

9. The microwaveable food package of claim 1, further comprising an airtight package enclosing the container for shipping and handling.

10. The microwaveable food package of claim 1, wherein the first opaque line is disposed within a folded portion of the first sidewall when the container is in the collapsed shape such that the first opaque line is obscured from view, the first opaque line being exposed when the container is in the expanded shape.

11. The microwaveable food package of claim 1, wherein the glassine has a weight of about 60-90 gsm.

12. The microwaveable food package of claim 1, wherein the glassine has a weight of about 25-90 gsm.

13. The microwaveable food package of claim 1, wherein the translucent glassine material of the container has an opacity of about 50%-95%.

14. The microwaveable food package of claim 1, wherein the material has an opacity of about 80%-90%.

15. The microwaveable food package of claim 1, wherein at least one of the first opaque line or the second opaque line is horizontal when the container is placed for use in a microwave oven.

16. The microwaveable food package of claim 1, wherein at least one of the first opaque line or the second opaque line is horizontal when an open top of the container is positioned upright after cooking.

17. The microwaveable food package of claim 1, wherein the container is a gusset bag, each sidewall of the plurality of sidewalls is formed of the translucent glassine material.

18. The microwaveable food package of claim 1, wherein the microwaveable food package is included in a food kit, the microwaveable food package being disposed within an interior volume of an outer container of the food kit, the food kit including at least one additive contained in a non-microwaveable container disposed within the interior volume of the outer container of the food kit exterior to the microwaveable food package.

19. The microwaveable food package of claim 18, wherein the non-microwavable container is a first non-microwavable container, the at least one additive includes a dry additive in the first non-microwavable container and a wet additive in a second non-microwavable container.

20. The microwaveable food package of claim 1, wherein the expected volume of the popcorn after cooking is no more than 80% of the maximum volume of the interior volume of the container in the expanded shape.

21. A microwaveable food package, comprising:
a container having a first end portion and a second end portion and a plurality of sidewalls extended between the first end portion and the second end portion, the container having a first volume when the container is in an unexpanded configuration and a second volume when the container is in an expanded configuration, the second volume being greater than the first volume, an entirety of the container being formed of a material that is biodegradable and compostable, the container being free of cooking additives, perfluorochemicals, plastic and susceptors, at least one sidewall from the plurality of sidewalls including a first opaque indicium disposed between the first end portion of the container and the second end portion of the container and a second opaque indicium disposed between the first opaque indicium and the first end portion of the container, the first opaque indicium and the second opaque indicium each being disposed within a folded portion of the at least one sidewall when the container is in the unexpanded configuration such that the first opaque indicium and the second opaque indicium are obscured from view, the first opaque indicium and the second opaque indicium being exposed when the container is in the expanded configuration; and
popcorn disposed within the container, the popcorn configured to expand while cooking under an application of microwave energy, the popcorn having an expected volume after cooking,
the first opaque indicium indicating the expected volume after cooking of 70% to 90% of the second volume of the container,
the second opaque indicium indicating a maximum volume of the popcorn in the container after cooking.

22. The microwavable food package of claim 21, wherein the plurality of sidewalls are entirely formed of a translucent glassine material.

* * * * *